(12) United States Patent
Grässer (10) Patent No.: US 9,863,782 B2
(45) Date of Patent: *Jan. 9, 2018

(54) AUTOMATED CALIBRATION OF A SURVEYING INSTRUMENT

(71) Applicant: Trimble AB, Danderyd (SE)

(72) Inventor: Christian Grässer, Vallentuna (SE)

(73) Assignee: TRIMBLE AB, Danderyd (SE)

( * ) Notice: Subject to any disclaimer, the term of this patent is extended or adjusted under 35 U.S.C. 154(b) by 337 days.

This patent is subject to a terminal disclaimer.

(21) Appl. No.: 14/614,093

(22) Filed: Feb. 4, 2015

(65) Prior Publication Data

US 2015/0153200 A1 Jun. 4, 2015

Related U.S. Application Data

(63) Continuation of application No. 12/735,727, filed as application No. PCT/EP2008/052536 on Feb. 29, 2008, now Pat. No. 8,978,440.

(51) Int. Cl.
*G01C 15/00* (2006.01)
*G01C 25/00* (2006.01)

(52) U.S. Cl.
CPC ............. *G01C 25/00* (2013.01); *G01C 15/00* (2013.01)

(58) Field of Classification Search
CPC ................................ G01C 15/00; G01C 25/00
USPC .................................................. 73/1.75, 1.79
See application file for complete search history.

(56) References Cited

U.S. PATENT DOCUMENTS 5,297,065 A 3/1994 Cage et al.
5,684,578 A 11/1997 Nower et al.
5,703,597 A 12/1997 Yu et al.
6,119,355 A 9/2000 Raby
6,310,644 B1 10/2001 Keightley (Continued)

FOREIGN PATENT DOCUMENTS

DE 101 05 774 A1 8/2001
EP 1 840 593 A1 10/2007

(Continued)

OTHER PUBLICATIONS

International Search Report PCT/ISA/210 for International Application No. PCT/EP2008/052536 dated Mar. 5, 2009.

(Continued)

*Primary Examiner* — Helen Kwok
*Assistant Examiner* — Nashmiya Fayyaz
(74) *Attorney, Agent, or Firm* — Kilpatrick Townsend & Stockton (57) ABSTRACT

The present invention provides a method for calibrating a geodetic instrument, an instrument and a computer program product thereof. In the method and geodetic instrument of the present invention, a value of at least one parameter affecting the measurements made by the instrument is detected and compared with a predetermined threshold. On the basis of the comparison between the detected value and the predetermined threshold, the instrument aims at a reference target and a calibration is performed using the reference target. The present invention is advantageous in that the accuracy and reliability of the measurements performed by the instrument are increased. Further, the present invention is advantageous in that the requirements on mechanical stability are reduced.

18 Claims, 8 Drawing Sheets

(56) References Cited

U.S. PATENT DOCUMENTS

| | | | |
|---|---|---|---|
| 6,462,777 | B1 | 10/2002 | Hamaguri |
| 7,388,658 | B2 | 6/2008 | Glimm |
| 2003/0023380 | A1 | 1/2003 | Woloszyk et al. |
| 2006/0170908 | A1 | 8/2006 | Glimm |
| 2007/0047940 | A1 | 3/2007 | Matsumoto et al. |
| 2007/0104353 | A1 | 5/2007 | Vogel |
| 2007/0180716 | A1 | 8/2007 | Hertzman |
| 2009/0138233 | A1 | 5/2009 | Kludas et al. |
| 2010/0064534 | A1 | 3/2010 | Schumacher et al. |
| 2011/0099822 | A1 | 5/2011 | Koleszar et al. |
| 2016/0091620 | A1* | 3/2016 | Paros ............... G01V 1/18 73/1.39 |

FOREIGN PATENT DOCUMENTS

| | | | |
|---|---|---|---|
| WO | WO-2004/001333 | A1 | 12/2003 |
| WO | WO-2004057269 | A1 | 7/2004 |
| WO | WO-2005059473 | A2 | 6/2005 |
| WO | WO-2007/031248 | A2 | 3/2007 |

OTHER PUBLICATIONS

Written Opinion of the International Searching Authority PCT/ISA/237 for International Application No. PCT/EP2008/052536 dated Mar. 5, 2009.

International Preliminary Report on Patentability PCT/IPEA/409 for International Application No. PCT/EP2008/052536, dated May 31, 2010.

* cited by examiner

AUTOMATED CALIBRATION OF A SURVEYING INSTRUMENT

CROSS-REFERENCE TO RELATED APPLICATIONS

This is a Continuation of U.S. application Ser. No. 12/735,727, filed Sep. 15, 2010, which is a National Phase Application of PCT/EP2008/052536, filed Feb. 29, 2008, the entire contents of each of which are hereby incorporated by reference.

FIELD OF THE INVENTION

The present invention generally relates to systems and methods for surveying. The present invention relates in particular to a method for calibrating a geodetic instrument, a geodetic instrument and a computer readable product thereof.

BACKGROUND ART

The art of surveying involves the determination of unknown positions, surfaces or volumes of objects using measurements of angles and distances. In order to make these measurements, a surveying instrument frequently comprises an electronic distance measurement unit (EDM unit) which may be integrated in a theodolite, thereby forming a so-called total station. A total station combines electronic, optical and computer techniques and is furthermore provided with a computer or control unit with writable information for controlling the measurements to be performed and for storing data obtained during the measurements. Preferably, the total station calculates the position of a target in a fixed ground-based coordinate system. In, for example, WO 2004/057269 by the same applicant, such a total station is described in more detail.

Figure 1:
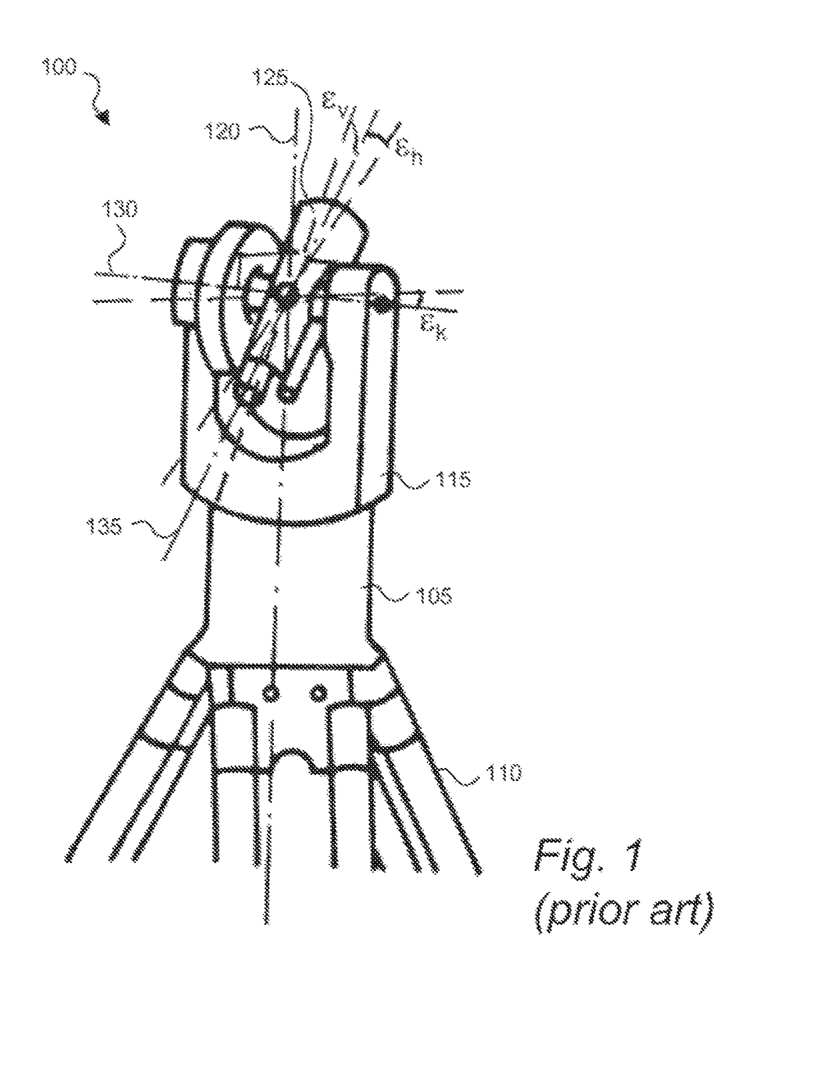
FIG. 1 shows a view of a total station according to prior art.

A theodolite is schematically shown in FIG. 1, which figure will be used in the following to illustrate the typical errors that may occur in such surveying instruments. The theodolite 100 comprises a base with tribrach 105 mounted on a tripod 110, an alidade 115 mounted on the base for rotation about a vertical axis 120 and a confer unit 125 mounted on the alidade for rotation about a horizontal axis 130.

The center unit 125 of the theodolite 100 comprises a telescope and optical elements for aiming at a target.

In the case of a total station, there may also be provided, in the center unit 125, an EDM unit which operates generally in the direction of the optical axis of the center unit, i.e. along the line of sight 135.

In a conventional EDM unit, a radiation beam is emitted from a radiation source, also called transmitter, as light towards the surface of a target (or scene) and the light beam that is reflected against the surface is detected by a receiver at the EDM unit, thereby generating a signal. Processing of the detected signal according to e.g. a time of flight measurement method or modulation phase shift measurement method enables the determination of the distance to the surface, i.e. the distance between the EDM unit and the target.

Accuracy of the measurements relies in part on mechanical stability of the geodetic instrument. In particular, the instrument performs accurate measurements if the various axis of the instrument are perfectly parallel or perpendicular to each other. For example, the axis of the EDM unit is preferably parallel to the axis of the center unit, i.e. the line of sight 135 of the total station 100.

As some deviation of the instrument axis from ideal positions normally occurs during the production or use of the instrument, accurate measurements relies on alignment and calibration of the various devices, optical channels and/or axis of the instrument. The optical channels may for instance be the line of sight and/or the transmitting and receiving optical channels of the EDM unit.

In the following, alignment and adjustment will be differentiated from calibration. Calibration is a process in which a parameter or instrument setting is measured and compared with a reference value. The difference between the measured value and the reference value is used to compensate the deviation using e.g. mathematical algorithms. The deviation may still physically be present but the influence of the deviation is cancelled or at least reduced. Alignment and adjustment are used to minimize the deviation by, e.g., mechanical, electrical, optical compensations.

For example, there may be a collimation error, which is illustrated in FIG. 1 by a vertical deviation $\epsilon_v$ and/or a horizontal deviation $\epsilon_h$ of the line of sight in vertical dimension (direction of a reference vertical axis) and horizontal dimension (direction perpendicular to a reference horizontal axis), respectively. There may also be a deviation $\epsilon_k$ of the horizontal axis 130 in a direction perpendicular to a reference vertical axis. This deviation $\epsilon_k$ represent a trunnion axis error of the total station 100, which deviation contributes to errors when aiming at targets out of the horizon.

Normally, calibration and alignment of the different optical channels and the axis of the instrument are performed at the production stage, e.g. during the manufacturing of the instrument and/or once the instrument is ready for sale. For instance, the axis of the EDM unit, in particular the relative positions of the transmitter and the receiver in respect to the line of sight may be adjusted (aligned). Further, the collimation errors as described above may be decreased by means of mechanical alignment. However, there may still be, after mechanical adjustment, a remaining deviation which can be measured and included in the instrument settings (calibration values) for compensation. The total station may also be subject to mechanical shock loads and temperature changes in order to test if the alignment and/or the calibration are sufficiently stable.

Further, a user may perform field calibration in accordance with instructions described in a user manual. For example, it is recommended to perform, for improving measurement accuracy, a manual calibration about fifteen minutes after starting the instrument, which corresponds to the period of time required by the instrument to warm up.

With a manual procedure, the user may for instance calibrate the collimation of the line of sight by aiming at a target according to a two-face measurement. The two-face measurement is based on the symmetry of the theodolite which allows reading of two angles when aiming at the same target. The direction angle, i.e. the combination of a horizontal angle and a vertical angle, is first read for a first face (face one) and, after rotating the instrument around the vertical axis by 200 gon and the center unit around the horizontal axis by 200 gon, the direction angle is read for a second face (face two). The difference between the horizontal angles (one read for the first face one and the other for the second face) reduced by 200 gon results in two times the collimation error in horizontal direction, i.e. $2\epsilon_h$. The difference between 400 gon and the sum of the vertical angles (one read for the first face (face one) and the other one for the second face (face two)) results in two times the collimation error in vertical direction, i.e. $2\epsilon_v$. The resulting deviations are then used to compensate angle readings during measurement sessions. Further, the user may calibrate the level point of the tilt sensor in the instrument by rotating the instrument around its vertical axis by approximately 200 gon.

However, a drawback of prior art methods and surveying instruments such as described above is that accuracy and reliability of the measurements are limited. Further, the requirement on mechanical stability is high, thereby increasing cost and time needed for the development of geodetic instruments.

Thus, there is a need for providing new methods and systems that would overcome these problems.

SUMMARY OF THE INVENTION

An object of the present invention is to wholly or partly overcome the above disadvantages and drawbacks of the prior art and to provide a more efficient alternative to the above techniques and prior art.

More specifically, it is an object of the present invention to provide a method for calibrating a geodetic instrument and a geodetic instrument thereof in order to increase the accuracy and/or reliability of the measurements made by the instrument.

Another object of the present invention is to provide a method and surveying instrument for reducing, the requirements on mechanical stability.

These and other objects of the present invention are achieved by means of a method, a surveying instrument and a computer program product having the features defined in the independent claims. Preferable embodiments of the invention are characterised by the dependent claims.

Hence, according to a first aspect of the present invention, a method for calibrating a geodetic instrument is provided. The method comprises the steps of detecting a value of at least one parameter affecting the measurements made by the instrument and comparing the detected value of the parameter with a predetermined threshold. Further, the method comprises the steps of aiming the instrument at a reference target on the basis of the comparison between the detected value of the parameter and the predetermined threshold and performing a calibration using the reference target.

According to a second aspect of the present invention, a geodetic instrument is provided. The geodetic instrument comprises a base, an alidade rotationally mounted on the base for rotation about a first axis, a center unit rotationally mounted on the alidade for rotation about a second axis, a processing unit and at least one detector for detecting the value of at least one parameter affecting the measurements made by the instrument. The processing unit is configured to compare the detected value of the parameter with a predetermined threshold, control the alidade and the center unit for aiming the instrument at a reference target on the basis of the comparison between the detected value and the predetermined threshold, and perform calibration of the instrument using the reference target.

According to a third aspect of the present invention, there is provided a method for informing about the status of a geodetic instrument. The method comprises the steps of detecting a value of at least one parameter affecting the measurements made by the instrument comparing the detected value with a predetermined threshold and sending an alert on the basis of the comparison.

According to a fourth aspect of the present invention, there is provided a computer program product, loadable info an internal memory of a geodetic instrument according to the second aspect of the present invention, comprising software code portions for causing a control unit or processor of the geodetic instrument to perform steps in accordance with the first aspect of the present invention.

According to a fifth aspect of the present invention, there is provided a computer program product, loadable into an internal memory of a geodetic instrument, comprising software code portions for causing a control unit or processor of the geodetic instrument to perform steps in accordance with the third aspect of the present invention.

The present invention is based on the idea of controlling when calibration of a geodetic instrument is to be performed. The need for calibration is determined by detecting the values of parameters affecting the measurements made by the geodetic instrument and comparing these detected values to predetermined thresholds.

With the present invention, the geodetic instrument determines itself if calibration is to be performed. The need for calibration of the geodetic instrument is detected by detectors and does not require the subjective intervention of a user such as in prior art techniques.

For example, in the case of a surveying instrument installed for monitoring of bridges or tunnels, the need for calibration is detected by the instrument itself and does not require the presence of a person close to the instrument.

The present invention achieves a number of advantages. For instance, the geodetic instrument and method of the present invention are advantageous in that the calibration of the instrument is performed when it objectively is needed and not according to the subjective evaluation of a user. With the present invention, calibration may be performed on a regular basis. In contrast, with prior art systems, a user may often recognize the need for calibration only when abnormal results are obtained, i.e. too late.

Further, the present invention is advantageous in that the geodetic instrument may be used without waiting for acclimatization of the instrument to ambient temperature or waiting during the period of time required by the instrument to warm up. Indeed, with the present invention, it is possible to perform a calibration during the increase in temperature of the instrument.

Further, the present invention is advantageous in that it simplifies the design of a geodetic instrument. Indeed, as the need for calibration is automatically detected, accuracy of the measurements is ensured by calibration and the requirements on mechanical stability of the instrument are reduced or at least relaxed.

Further, as the requirements on mechanical stability are reduce, the present invention is advantageous in that the geodetic instrument may be made of e.g. lightweight material such as plastic material. Thus, the weight of the instrument and the material cost for producing the instrument may be reduced.

Further, because the requirements on mechanical stability are relaxed, the present invention is advantageous in that it simplifies the development of geodetic instruments. Consequently, both time and cost for the development of geodetic instruments may be reduced.

Further, the present invention is advantageous in that the number of calibration tests made in production may be reduced. Further, the present invention may be advantageous in that the periodicity of field calibration can be well controlled. More specifically, the periodicity of field calibration may be controlled by adjusting the values of the predetermined thresholds. For example, if it is considered too infrequent to calibrate the instrument when the temperature of the instrument exceeds a first temperature threshold, a second temperature threshold lower than the first temperature threshold may be used to increase the periodicity of the calibration.

In the method of the present invention, parameters affecting measurements made by the instrument are detected. These parameters may for instance affect the reliability and/or accuracy of the instrument. The geodetic instrument of the present invention comprises at least one detector for detecting such a parameter.

Referring to the third aspect of the present invention in particular, seeding an alert for informing about the status of the geodetic instrument is advantageous in that a user is informed that something has happened with the geodetic instrument (the value of a parameter has changed). As a result, a calibration may be performed immediately or at a later stage. Alternatively, the alert may comprise a service message advising to perform a service on the geodetic instrument. If the change of the parameter exceeds a predetermined value, a service may be recommended instead of a calibration.

The status of the geodetic instrument may be that a calibration is needed, a service is required or possibly that nothing has to be done. The status may be included in the alert.

It is noted that the method according to the third aspect of the present invention may be implemented in a geodetic instrument in a similar manner as the method according to the first aspect of the present invention.

Further, a person skilled in the art will recognize that most of the following embodiments, although being described with reference to the first aspect of the present invention, may be applied in combination with the method according to the third aspect of the present invention.

According to an embodiment, the geodetic instrument may comprise a temperature sensor for detecting the temperature of the instrument. In the present embodiment, a calibration is performed upon a change in temperature of the instrument. Indeed, accuracy and/or reliability of the instrument may suffer from temperature changes since every material expands or contracts with temperature. Alternatively, the temperature sensor may be adapted to detect the ambient temperature.

Further, it may be recommended to take into account the time required for acclimatization of the instrument to the ambient air. Thus, it may be advantageous to detect the difference between the temperature of the instrument and the ambient temperature.

According to another embodiment, the instrument may comprise en acceleration sensor for detecting an acceleration, which may also affect the accuracy and/or reliability of the instrument. Detection of an acceleration may e.g. correspond to the detection of a mechanical shock or transport stress to which the instrument is subject, or has been subject.

According to another embodiment, the instrument may comprise a tilt sensor for detecting a tilt angle which corresponds to a deviation between the instrument vertical axis and a vertical reference plumb axis. For example, if a user inadvertently bumps into the instrument, the tilt sensor may detect a variation of the tilt angle. If the variation exceeds a predetermined threshold, i.e. an allowable variation of the tilt angle, a calibration of the instrument may be performed.

According to yet another embodiment, the parameter to be detected may be a period of time and the geodetic instrument may comprise a timer to detect if the period of time has expired. The period of time may preferably be expressed in terms of months, weeks, days, hours, minutes and/or seconds and corresponds to the periodicity between every calibration of the instrument. The present embodiment is advantageous in that the periodicity of the calibration is not dependent on the subjective evaluation of a user but, instead, is programmed to start at predetermined intervals. The periodicity may for instance be adapted to the frequency at which the instrument is used. Normally, the frequency of the calibration increases with the frequency of use.

According to an embodiment, the detected value of the parameter is recorded, e.g. in a memory of the instrument, if the instrument is turned off. The detected value is then compared with a predetermined threshold once the instrument is turned on. The present embodiment is advantageous in that the variation of the parameter is monitored even if the instrument is turned off. Thus, a calibration may also be performed because of a parameter change occurring while the instrument is turned off. For example, the instrument may record that it has been subject to a shock during transport from a worksite to another and therefore perform a calibration once it is turned on. Referring to prior art instruments, a user may easily miss that the instrument is subject to a shock during transport and would therefore not necessarily perform a calibration once the instrument is turned on. The present embodiment is also advantageous in that the user may be less careful in transporting the instrument since the instrument detects itself the need for calibration.

Depending on the type of parameter and the type of predetermined threshold associated with the parameter, a calibration may be performed if the detected value exceeds a predetermined threshold or if the detected value is below a predetermined threshold. For example, if the parameter to be detected or monitored is the ambient temperature, calibration may either be performed if the temperature is below a first predetermined threshold or if the temperature exceeds a second predetermined threshold. Further, the need for calibration may also be determined depending on the rate at which the temperature increases. For example, a calibration may be performed every time the temperature has increased by a predefined value, for example, every two degrees.

According to an embodiment, a calibration is performed if the detected value exceeds or is below a predetermined threshold by a predefined value, which is advantageous in that a calibration is performed for a significant change of the parameter as compared with a predetermined threshold.

According to an embodiment, an alert is generated on the basis of the comparison between the detected value of the parameter and the predetermined threshold. In response to the generated alert, the instrument receives a message including instructions for calibration. If the received message includes instructions to calibrate, the instrument aims at a reference target and performs a calibration. The present embodiment is advantageous in that the instrument detects itself the need for calibration but a user may decide on whether the calibration is performed. As the user receives an alert informing the need for calibration of the instrument, the user sends back a message including instructions for calibration. This message may comprise instructions to calibrate or instructions not to calibrate. The decision of the user to calibrate or not to calibrate may for instance depend on whether the instrument is currently measuring.

Depending on the type of parameters and the type of predetermined threshold associated with the parameter, the alert may be generated if the detected value exceeds a predetermined threshold or if the detected value is below a predetermined threshold. Further, the alert may be generated if the detected value exceeds or is below a predefined threshold by a predefined value.

According to an embodiment, the instrument is configured to retrieve the position of a reference target used in a previous calibration. Alternatively, the geodetic instrument is adapted to search for a reference target.

The reference target cooperates with the instrument during the calibration. The reference target may have various shapes and is suitable for calibration of the devices (units) of the instrument. In particular, the position of the reference target in a coordinated system is fixed (i.e. not moving, at least during the time of the calibration). In a configuration, the instrument comprises a tribrach at which the reference target may be arranged. In another configuration, the reference target is arranged at the base of the instrument. Alternatively, the reference target may be arranged at a tripod on which the instrument is mounted. In a further configuration, the target may be located in the vicinity of the instrument.

During the calibration, the instrument determines new settings or calibration values for the devices, elements and/or axis of the instrument, which settings are used to maintain reliability and accuracy of the instrument.

According to another embodiment, the processing unit of the instrument sends an acknowledgement indicating which instrument settings have been calibrated. Further, the acknowledgement may comprise the deviation between a calibrated instrument setting and a previous value of the instrument setting. A user may evaluate the quality of the calibration based on the deviation. Further, the user may also evaluate if the scheduling of the calibration is appropriate, i.e. if the calibration was not really needed or if the calibration was scheduled late, and adjust the predetermined thresholds accordingly.

According to an embodiment, the processing unit may be configured to compare an instrument setting obtained during the calibration with tolerance values, and send a service message if it is determined that the instrument setting is soon or already outside the tolerance values. The present embodiment is advantageous in that, depending on the content of the service message, it may be preferable to bring the instrument to service rather than to perform a calibration. If the instrument setting is close to the threshold value, the user may continue measuring with little accuracy limitation but also be advised to book a service date.

As mentioned above, there are a plurality of devices, elements and/or axis of the instrument that may be calibrated.

According to an embodiment, the geodetic instrument is equipped with a camera comprising an image sensor and the calibration includes calibration of the camera.

In another embodiment, the geodetic instrument is equipped with a tilt sensor for detecting if the instrument is tilted relative to a reference plumb vertical axis (deviation not shown in FIG. 1) and the calibration includes calibration of the tilt sensor.

In another embodiment, the calibration includes the determination of a collimation error in the vertical and/or horizontal dimension.

In another embodiment, the calibration includes the determination of a trunnion axis error ($\epsilon_k$).

In another embodiment, the calibration comprises the determination of the instrument orientation along a horizontal direction. In particular, the instrument orientation along the horizontal direction may be determined by comparing an image of the reference target acquired on a camera of the instrument with a stored image acquired at a previous calibration.

In yet another embodiment, the geodetic instrument is equipped with an electronic distance measurement unit (EDM unit) and the calibration includes calibration of the EDM unit.

In the following, a method for calibrating an EDM unit is described. The present method for calibration of an EDM unit may be part of the calibration of the instrument as defined in the present invention. However, the present method for calibration of an EDM unit may also be dissociated from the present invention and implemented on its own in any type of geodetic instruments. For example, the calibration procedure of an EDM unit as described below is not necessarily related to the detection of the value of a parameter to start the calibration.

The calibration method includes the step of scanning a region comprising the reference target. For each one of the positions of the scanned region, the EDM unit transmits a radiation beam towards the position and receives a radiation beam that is reflected against the position. Further, a processing unit of the instrument records the instrument angle corresponding to the position and a signal representative of the received radiation beam associated with the position. The processing unit recording the instrument angle and the signals may also be integrated in the EDM unit. Once all positions of the region have been scanned, at least one setting for the EDM unit is determined on the basis of an analysis of the recorded angles and signals. The present method for calibration of an EDM unit is an alternative method to prior art procedures for calibration of an EDM unit and may be implemented in any type of geodetic instruments.

According to an embodiment of the method for calibration of an EDM unit described above, the step of determining at least one setting for the EDM unit comprising the steps of mapping the strengths of the recorded signals as a function of the recorded angles and extracting the setting for the EDM unit from the mapping.

In particular, the EDM unit setting may correspond to the angle deviation between the axis of the EDM unit and the instrument axis (i.e. the line of sight 135 in FIG. 1). If there is a deviation between the axis of the EDM unit and the instrument axis, the EDM unit is calibrates so that the deviation does not influence the accuracy of the measurements and/or the range performance. For example, the deviation of the EDM axis is recorded and taken into account in the forthcoming measurements made by the EDM unit. Alternatively, the deviation of the EDM axis may be compensated by mechanically moving the transmitter and/or receiver of the EDM unit or by adjusting the transmitting optics and/or receiving optics of the EDM unit.

The setting for the EDM unit may also be the operation width of the EDM unit. The operation width can be extracted from the mapping of the strengths of the recorded signals as a function of the recorded angles. The operation width is representative of the overlapping between the receiver optical path and the transmitter optical path.

In a particular embodiment, if the operation width is outside predetermined tolerances, such information is included in the service message.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, in which.

All the figures are schematic, not necessarily to scale, and generally only show parts which are necessary in order to elucidate the invention, wherein other parts may be omitted or merely suggested.

DESCRIPTION OF PREFERRED EMBODIMENTS

Figure 2:
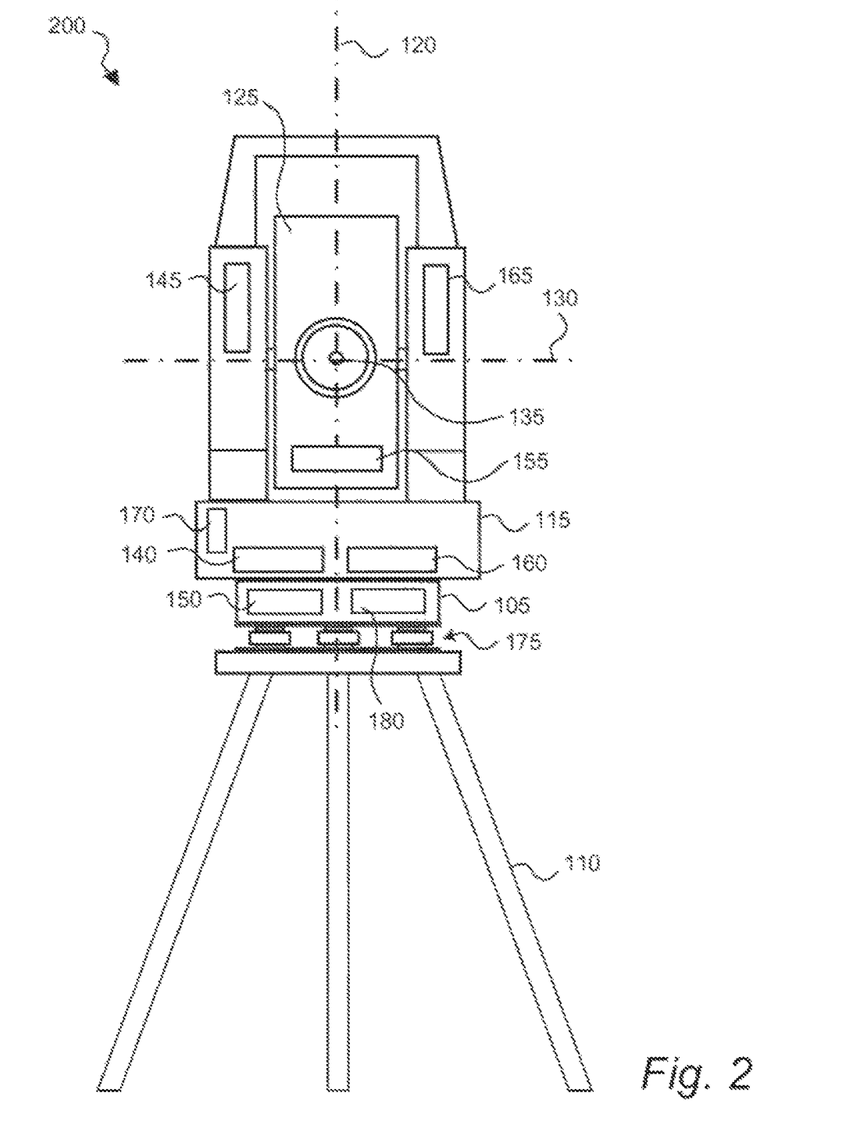
FIG. 2 shows a front view of a geodetic instrument according to an embodiment of the present invention.

With reference to FIG. 2, a first embodiment of the present invention will be described below.

A geodetic instrument, for example a total station, is schematically shown in FIG. 2. The total station 200 comprises a base 105, an alidade 115 mounted on the base for rotation about a vertical axis 120 and a center unit 125 mounted on the alidade for rotation about a horizontal axis 130. The total station 200 further comprises a processing unit 150 and at least one detector 170.

In the present embodiment, the processing unit 150 is arranged at the base 105 of the total station 200. However, the processing unit 150 may also be arranged at e.g. the alidade 115 or the center unit 125 as long as a connection is established between the processing unit 150 and the detector 170. According to an embodiment, the processing unit 150 may be a remote unit which communicates with the detector 170 and other elements (units) of the total station 200 by wireless communication.

As shown in FIG. 2, the base 105 of the instrument 200 may be mounted on a tripod 110.

The base 105 is a non-rotating part of the geodetic instrument and may mounted on a tribrach for leveling purposes.

Normally, the center unit 125 comprises a telescope having a sighting axis, or line of sight, 135. A controllable drive 140 is provided for rotating the alidade 115 about the vertical axis 120 in response to a horizontal angle control signal. An angle sensor 160, such as an angular encoder or a magnetic or capacitive angle resolver, produces a horizontal measurement signal, representing the horizontal angular position of the alidade 115 relative to the base 105. Similarly, a controllable drive 145 is provided for rotating the center unit 125 about the horizontal axis 130 in response to a vertical angle control signal, and an angle sensor 165 is provided for producing a vertical measurement signal, representing the vertical angular position of the center unit 125 relative to the alidade 115.

In operation, the base 105 is installed on the tripod 110 at s desired angular orientation relative to a horizontal reference external to the total station, such as geodetic or magnetic north, and with the vertical rotation axis 120 typically plumb. As the drive 140 rotates the alidade 115, the horizontal measurement signal indicates instantaneous angular orientation of the alidade relative to the base 105. Similarly, as the drive 145 rotates the center unit 125, the vertical measurement signal indicates instantaneous angular orientation of the center unit relative to the alidade. Input signals for the drives 140, 145 may be provided, for example, by input from an operator using a keypad or a knob, or by a tracking subsystem 155 within the total station 200.

It is noted that other type of surveying instruments may have two or more different lines of sight. A first line of sight may be provided by an optical telescope comprising a reticule, an objective and ocular for manual aiming at targets, and a second line of sight may be provided by an objective and a position sensitive detector (e.g quadrant detector or camera chip) such as in a geodetic instrument having a tacking function. Such an instrument will be called a tracker in the following. A tracker allows automatic aiming at cooperating targets comprising for instance a prism and/or light emitting sources. Further, if the target moves, the tracker moves accordingly. The telescope or the positions sensitive detector may be used to determine the direction angles towards a target in relation to a reference direction.

Figure 3:
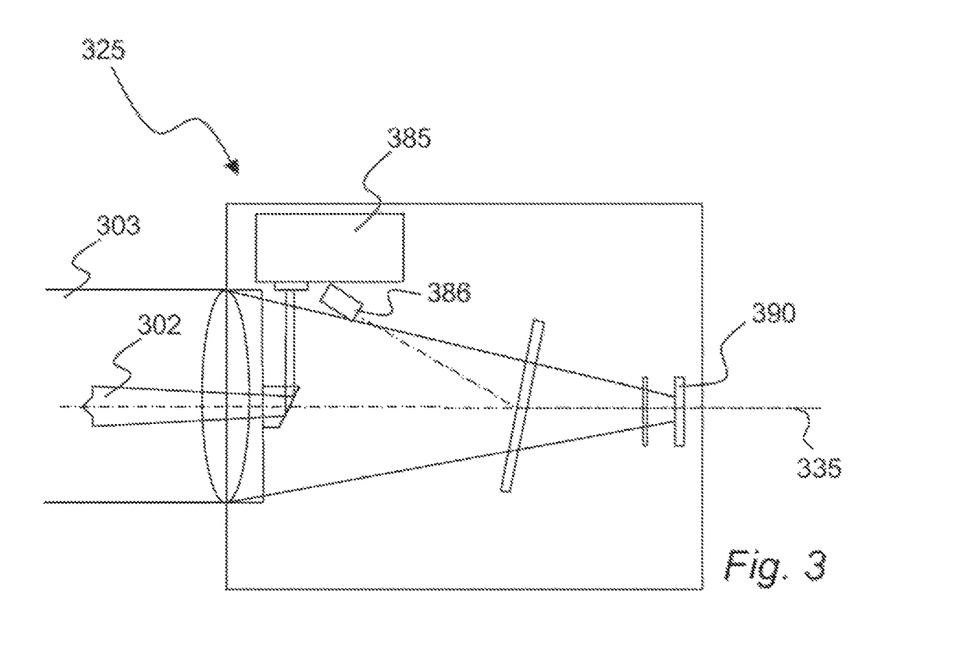
FIG. 3 shows a side view of a center unit of a geodetic instrument according to another embodiment of the present invention.

With reference to FIG. 3, another embodiment of a geodetic instrument according to the present invention will be described.

FIG. 3 is a side view of a center unit 325. In an embodiment, the center unit 325 may be equivalent to the center unit 125 described with reference to FIG. 2.

It is noted that, for clarity purposes, FIG. 3 shows only a number of components that a center unit may comprise. In, for example, WO 2004001333 by the same applicant, a center unit is described in more detail. Such center units may be used in the total station 200 of the present invention.

In the center unit 325, there is provided an electronic distance measurement unit (EDM unit) generally designated 385. The EDM unit 385 operates generally in the direction of the optical center of the center unit 325, i.e. along the line of sight 335 (135 in FIG. 2), within the overlap between the angular cones defined by the transmitting optical channel 302 and the receiving optical channel 303. The divergence of the angular cone 302 is determined primarily by the transmitting and receiving optics in the EDM unit. The EDM comprises typically a transmitter for transmitting a radiation beam and a receiver 386 for receiving a radiation beam that is reflected against e.g. a target. The EDM unit calculates the distance between the target and the total station based on the received signals.

Further, the center unit 325 may comprise a digital camera 390 for detecting a target that cooperates with the total station for example by emitting light of known characteristics (e.g. modulated), by reflecting modulated light, by being of a known geometrical shape or pattern and/or by reflecting ambient light such as daylight. The camera 390 comprises typically an image sensor (or camera chip) for providing an image of a scene corresponding to the camera's field of view. Alternatively, the EDM unit may comprise a telescope for visual sighting by eye.

The center unit 325 may further comprise a camera chip processing unit adapted to calculate position of a detected target relative to the image sensor. The processing unit 150 of the total station may be adapted to receive input from the camera chip processing unit and to calculate the direction to the target relative to the center unit 125 based on the input from the camera chip processing unit.

As mentioned above, the center unit 125 of the total station described with reference to FIG. 2 may be replaced by the center unit 325 described with reference to FIG. 3.

Turning back to FIG. 2, the detector 170 may be any detector adapted to detect a parameter affecting the measurements made by the total station 200. In particular, the detected parameter may affect the accuracy and/or the reliability of the measurements made by the total station 200. The measurements made by the total station 200 may for instance be distance measurements provided by the EDM unit 385 and/or angle measurements provided by the angle sensors 160, 165.

Although only one detector is depicted in FIG. 2 for clarity purposes of the drawing, the total station 200 may comprise a plurality of various detectors.

The detector 170 may for instance be a temperature sensor adapted to detect the temperature of the instrument or the ambient temperature.

The detector 170 may be an acceleration sensor adapted to detect an acceleration. Such a detector 170 could for instance detect a mechanical shock or transport stress to which the instrument is subject or has been subject.

The detector 170 may be a tilt sensor adapted to detect a tilt angle corresponding to the deviation between the instrument vertical axis 120 and a vertical reference plumb axis. For example, if a user inadvertently bumps into the instrument (or moves the instrument by inadvertence), the tilt sensor detects a deviation between the vertical axis 120 of the total station 200 and a vertical plumb reference axis. The vertical plumb reference axis is not shown in FIG. 2 since it is assumed that the vertical axis 120 of the total station 200 is plumb.

The detector 170 may be a timer adapted to detect if a period of time has expired. The period of time may preferably be expressed in terms of months, weeks, days, hours, minutes and/or seconds and corresponds to the periodicity between every calibration of the installment.

According to an embodiment, the total station or geodetic instrument 200 comprises a memory 180 adapted to record the detected value of the parameter, even if the total station 200 is turned off (e.g. during transport of the total station 200 from a worksite to another). In the present embodiment, a connection is established between the detector 170 and the memory 180 and a connection is established between the memory 180 and the processing unit 150. The detector 170 and the memory 180 are both active, i.e. powered on, even if the total station 200 is powered off.

Figure 4:
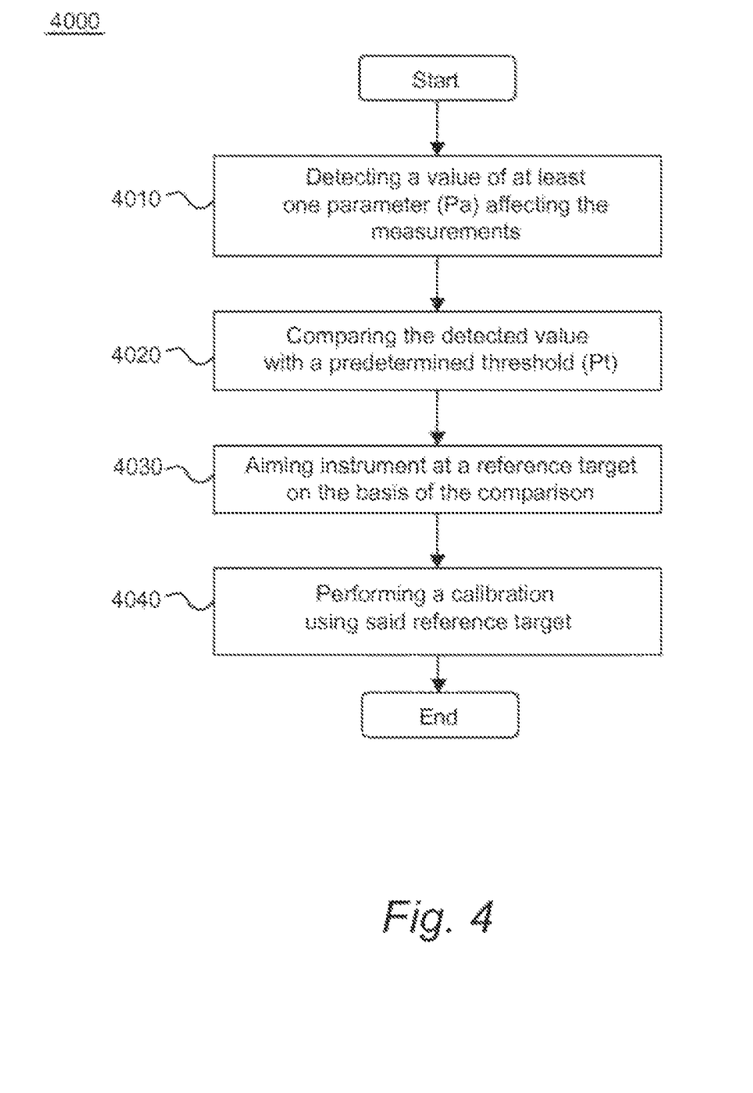
FIG. 4 shows a flow diagram of a calibration procedure according to an embodiment of the present invention.

With reference to FIG. 4, a method for calibrating a geodetic instrument in accordance with an embodiment of the present invention will be described.

The method 4000 may be implemented in the total station 200 described with reference to FIG. 2 or a combination of FIGS. 2 and 3.

At step 4010, the detector 170 detects the value of a parameter $P_a$, for instance the ambient temperature which, for exemplifying purposes, may be equal to 25° C.

The detector 170 may be configured to transmit the detected value of the parameter to the processing unit 150 upon request from the processing unit 150 or may be set to transmit the detected value every second or every other suitable period of time.

Once the processing unit 150 receives the detected value of a parameter, if compares the detected value of 25° C. with a predetermined threshold $P_t$, for instance 20° C., at step 4020. The predetermined threshold may be an allowable minimum value or an allowable maximum value. In the present example, the predetermined threshold is an allowable maximum value.

Alternatively, the detector may be configured to itself compare the detected value with the predetermined threshold. In an embodiment, the detector may be configured to transmit the difference, +5° C. in the present example, between the detected value and the predetermined threshold to the processing unit 150. The sign of the difference indicates if the detected value exceeds or is below a predetermined threshold. In the present example, the difference is positive which indicates that the detected value exceeds the threshold.

In the case where the detected value is recorded during the total station 200 is turned off, the detected value is transmitted to a memory for storage and, once the total station 200 is turned on, transmitted to the processing unit for comparison with a predetermined threshold.

On the basis of the comparison between the detected value and the predetermined threshold, it is determined whether the instrument is to be calibrated. If calibration is needed, the instrument aims at a reference target at step 4030.

A calibration is performed, at step 4040, when the detected value (25° C.) exceeds a predetermined threshold (20° C.) if the predetermined threshold corresponds to a maximal allowable value such as in the present example. Alternatively, a calibration is performed when the detected value is below a predetermined threshold if the predetermined threshold corresponds to a minimal allowable value.

According to an embodiment, a calibration may be performed if the detected value exceeds or is below a predetermined threshold by a predefined value $\Delta P_t$.

The calibration results in new instrument settings $P_t$ which enable reliable and accurate measurements.

Figure 5:
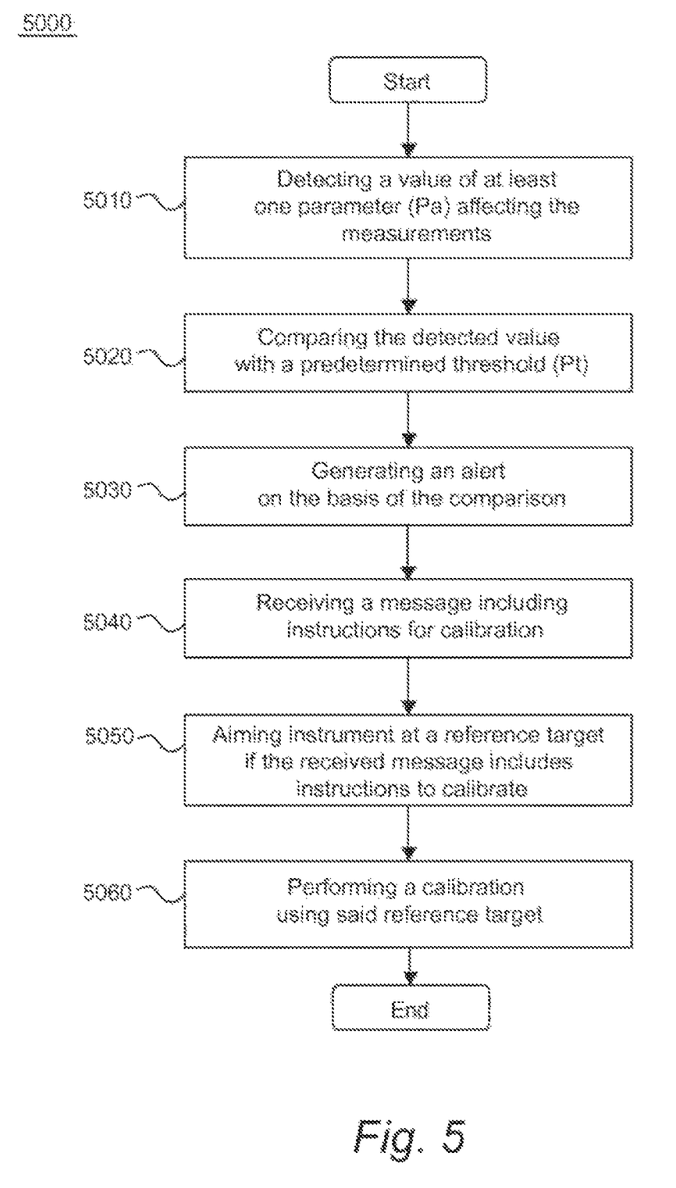
FIG. 5 shows a flow diagram of a calibration procedure according to another embodiment of the present invention.

With reference to FIG. 5, a method 5000 for calibrating a geodetic instrument according to another embodiment of the present invention will be described. The method may be implemented in a total station 200 such as described with reference to FIG. 2 or a combination of FIGS. 2 and 3.

At step 5010, the detector 170 detects the value of a parameter $P_a$. The detector 170 may be configured to transmit the detected value of the parameter to the processing unit 150 upon request from the processing unit 150 or may be set to transmit the detected value every second or every other suitable period of time.

Once the processing unit 150 receives the detected value of the parameter, it compares the detected value with a predetermined threshold $P_t$, at step 5020.

Alternatively, the detector may be configured to itself compare the detected value with the predetermined threshold. In an embodiment, the detector may be configured to transmit the difference between the detected value and the predetermined threshold to the processing unit 150. The sign of the difference indicates if the detected value exceeds or is below a predetermined threshold.

In the case where the detected value is recorded during the total station 200 is turned off, the detected value is transmitted to a memory for storage and, once the total station 200 is turned on, transmitted to the processing unit for comparison win a predetermined threshold.

On the basis of the comparison between the detected value and the predetermined threshold, it is determined whether the instrument is to be calibrated. If calibration is needed, the instrument generates an alert informing the need for calibration of the instrument, at step 5030.

The alert may be generated when the detected value exceeds a predetermined threshold if the predetermined threshold corresponds to a maximal allowable value. Alternatively, the alert may be generated when the detected value is below a predetermined threshold if the predetermined threshold corresponds to a minimal allowable value.

According to an embodiment, the alert is generated if the detected value exceeds or is below a predetermined threshold by a predefined value $\Delta P_t$.

At step 5040, the instrument receives a message including instructions for calibration. If the received message includes instructions to calibrate, the instrument aims at a reference target at step 5050. A calibration is performed, at step 5060, using the reference target.

The reference target is adapted to cooperate with the instrument for performing the calibration and is preferably suitable for calibration of the various devices, elements and/or axis of the instrument.

Figure 8:
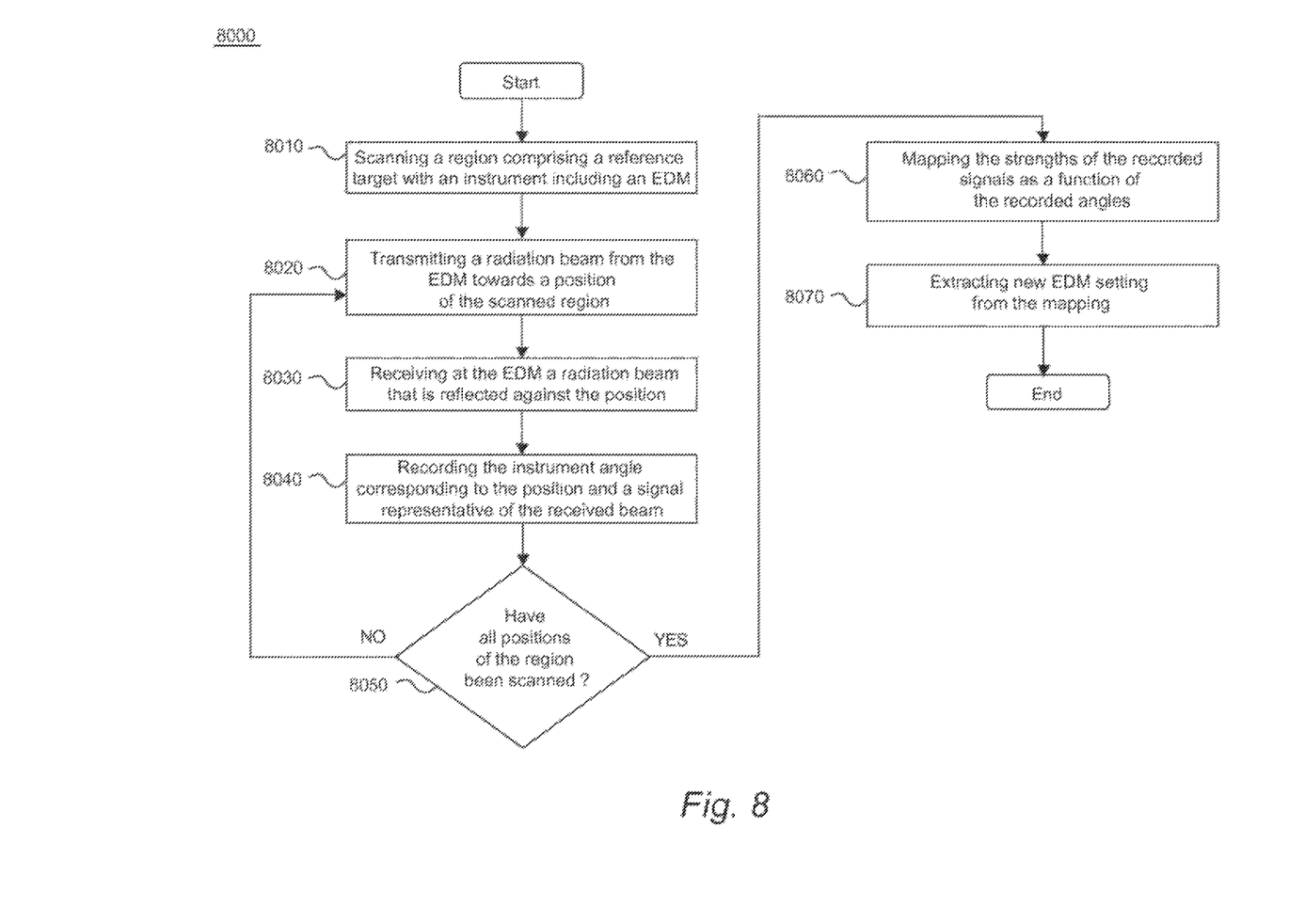
FIG. 8 shows a flow diagram of a calibration procedure for an EDM unit according to an embodiment of the present invention.

With reference to FIG. 8, examples of reference targets will be described.

Figure 6:
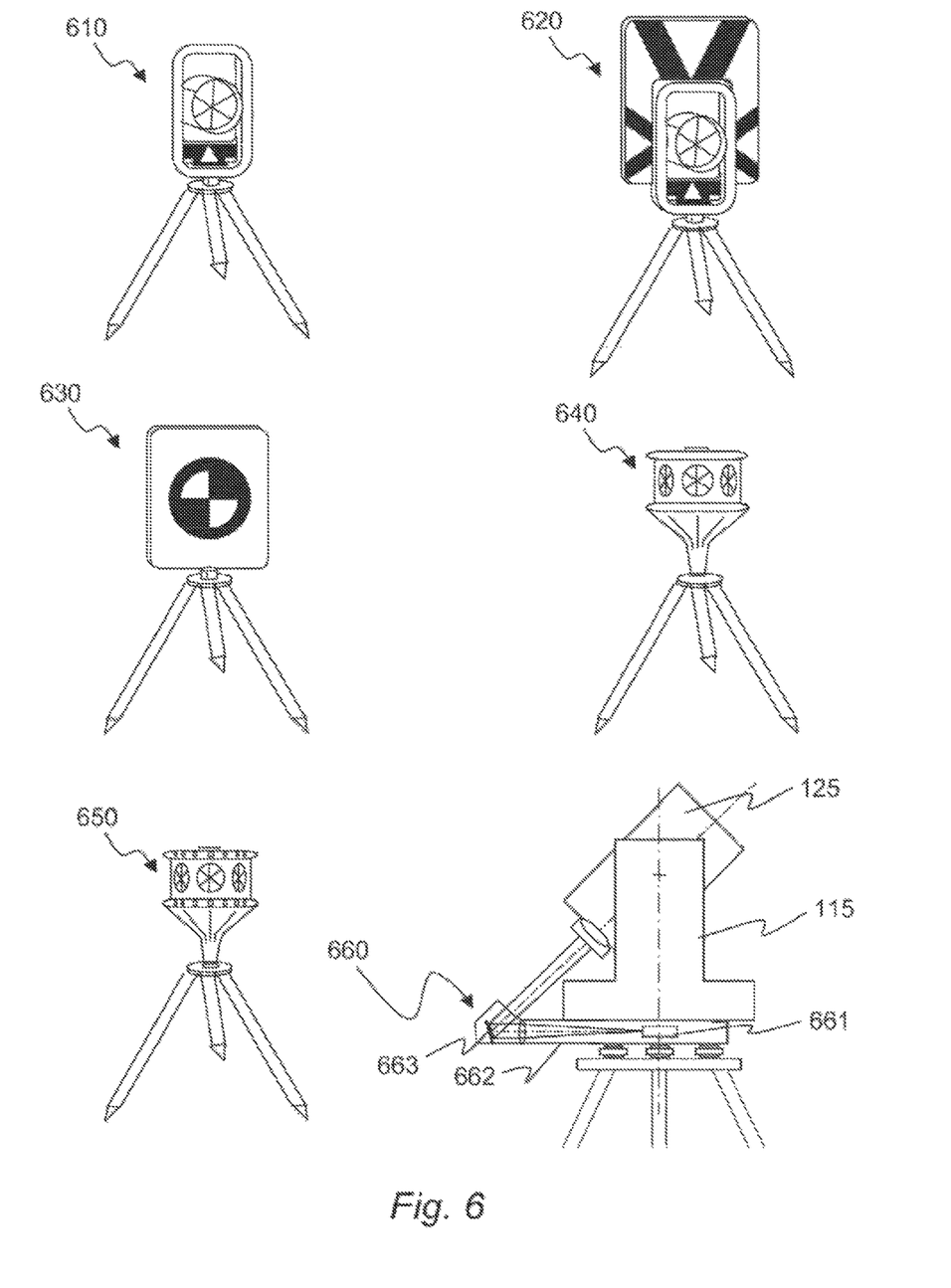
FIG. 6 shows examples of reference targets according to several embodiments of the present invention.

For example, the reference target may comprise a prism, as illustrated by the target designated 610. The target 610 may be mounted on a tripod, with or without a tribrach. The prism of the target 610 has good reflecting property as for example a corner cube prism, and light is reflected from the center of the prism, which is suitable for calibration of an EDM unit.

Such a target may also be provided with a target plate placed around the prism. On the target plate of the target 620, a pattern comprising a number of black and white lines is drawn in such a manner that the drawn lines, or at least their respective fictive extensions, intersect in a point corresponding to the center of the prism. Such a target 620 is advantageous in that the target is identifiable even if it is located at a great distance from the geodetic instrument. Aiming at the target 620 is therefore facilitated.

Alternatively, the reference target may be a target plate on which a pattern suitable for calibration of a camera is drawn, as illustrated by the target designated 630. For example, a circular pattern divided into four equivalent portions, two of which may be coloured, is a pattern generally suitable for image processing and therefore suitable for calibration of a camera of the instrument 200.

Alternatively, a reference target 640 may comprise a plurality of prisms arranged at a cylindrical portion of the target, the cylindrical portion being preferably placed at the top of the target. The prisms may be arranged at regular intervals, preferably distributed at equal distances from each other, around the 360 degrees provided by the cylindrical portion. Such a reference target is advantageous in that it can be used for different positions of the geodetic instrument around the reference target. In other words, the prism target 640 has a 360 degrees configuration that may be used from many different directions. Thus, even if the geodetic instrument is moved, it is still possible to find the target 640.

In another embodiment, such a reference target may also comprise light sources, for example LEDs. A target 650 is also called an active target and may be used in combination with a tracker as it can cooperate with the tracker.

Still referring to FIG. 6, preferred configurations for positioning a reference target will be described.

Although the preferred configurations described below may be used in combination with the present invention, i.e. the detection of a parameter affecting the measurements made by a geodetic instrument, these preferred configurations are not dependent on the detection of a parameter and may be used on their own.

FIG. 6 shows a target, generally designated 660, which is located in the base 105 of the geodetic instrument 200.

In this configuration, according to an example of operation, the center unit emits light which is deflected by a mirror 663 towards a collimator consisting of a focusing lens 662 and a reflection/source element 661. The focusing lens 662 focuses light at the surface of the reflection/source element 661. The reflection/source element 661 may comprise an optical fibre (e.g. a fibre having a core diameter in the order of 50 micrometers). The fibre may have a polished fibre end at the reflection/source element 661, which is advantageous in that light is reflected back to the collimator lens. The light is then transmitted back to the center unit. Alternatively, the reflection/source element 661 may comprise a semi-reflecting coating. In the present example, the source acts as a reflector. The reflective function can be used for calibration of EDM beams or other transmitter/receiver combinations.

According to another example of operation, the reflection/source element 661 may comprise a light source for transmitting collimated light to the center unit that can be used for example to calibrate a camera chip, collimation errors and/or trunnion axis errors.

Such a configuration is advantageous since it provides a reference target having a fixed position relative to the instrument. Furthermore the reference target is not necessarily located in the vicinity of the instrument where it may be disturbed. Such a configuration is not (or at least very little) sensitive to motion of the instrument. It also ensures that the distance between the center unit and the reference target remains unchanged between two measurements. In another configuration, the reference target may be arranged at the tripod on which the geodetic instrument is mounted.

According to an embodiment, the method of the present invention comprises a step of searching for a reference target. For example, the step of searching may be performed by scanning with the instrument a predefined region while emitting a radiation beam towards various positions of the predefined region. The reference target is detected by analysing the signals received at the instrument, which signals are representative of the reflected beams. The instrument may be rotated by controlling the controllable devices 140, 145 or may comprise a separate scanning unit. As another example, the step of searching may be performed by means of a camera and image analysis in order to detect a reference target in the field of view of the camera. Further, the step of searching may combine analysis of an image acquired by a camera and rotation of the instrument. If no reference target is detected in a first image acquired by the camera, the instrument may be rotated by an angle corresponding to e.g. the size of the field of view of the camera in order to acquire and analyze a second image.

In an embodiment, such searching is performed in a self-driven manner by the instrument (e.g. a tracker) which is equipped with drives and a position sensitive detector that cooperates with the optical signals from the target.

Once a reference target is found, the calibration of the various devices of the instrument may be performed. The present embodiment is advantageous in that aiming at the target can be of high accuracy. To the contrary, prior art techniques rely on manual aiming by a user, which may be of poor quality.

According to an embodiment, the position of a reference target is stored and retrieved if a calibration is needed. In this case, the step of searching is not performed.

By avoiding manual aiming, the calibration is improved and the accuracy of the measurements performed by the calibrated instrument is also increased.

According to an embodiment, the calibration includes calibration of the camera of the instrument. Referring to e.g. FIGS. 2 and/or 3, it is preferable to know the position and orientation of the centre of the camera relative to the instrument axis 120, 130 and 135. In, for example, WO 2005/059473 by the same applicant, calibration of a camera is described in more detail. In an embodiment, the calibration of the camera includes the steps of directing the instrument towards the reference target and generating images of calibration points at different positions on the image sensor and in two faces. In this procedure, for a first face, the instrument is moved so that the image of the target moves on the image sensor, thereby generating a plurality of calibration points. A calibration point is generated by detecting the position of the reference target on the image sensor of the camera. The instrument is then moved to a second face and a plurality of calibration points are generated as described above. For each of the calibration points, distance data representing the distance between the calibration point and the surveying instrument is determined. Further, for each image of the calibration points, position data representing the position of the image of the calibration on the image sensor and orientation data representing a horizontal angle of rotation of the tilting axis about the vertical axis and a vertical angle of tilting of the camera of the tilting axis are determined. The instrument setting for the camera, i.e. the calibration values or constants of the camera in relation to the instrument centre, are then calculated on the basis of these data.

According to an embodiment, the calibration includes the calibration of a tilt sensor. The tilt sensor may be located in the alidade. The tilt sensor is used to measure the deviation of the vertical axis from a reference plumb vertical line or axis. However, as the tilt sensor may have its own offset, a calibration of the tilt sensor is preferable. The calibration is performed at at least two points separated by 200 gon from each other. Preferably, four measurements, each with 2 positions separated by 200 gon, corresponding to four different angular locations are used to calculate the deviation of the vertical axis from the reference plumb line.

According to an embodiment, the calibration includes the determination of collimation error in the vertical or horizontal dimension of the line of sight 135, 335. The determination resorts in new instrument settings $P_i$ which cancel or at least minimize the collimation error. Such a determination may include the following steps: aiming at the reference target by manual means, e.g. using drives knobs, in the two faces of the instrument and reading the instrument angles towards the reference target. The calibration of the collimation errors is performed manually, in particular if the instrument comprises an ordinary telescope. In another embodiment, the determination includes the steps of aiming at the reference target by automatic means in the two faces of the instrument and reading the instrument angles towards the reference target.

According to an embodiment, the calibration includes the determination of an instrument setting Pi to correct an error or change in the general angle orientation of the instrument, e.g. the instrument horizontal orientation. The general angle orientation of the instrument may be calibrated by aiming at a reference target either manually using a telescope or automatically using the position sensitive detector of a tracker. The orientation of the instrument with respect to a known direction may be needed when measuring position data in an absolute coordinate system. In this procedure, the reference target is used to obtain the angle orientation of the total station at the beginning of a measurement session (as for instance obtained after a calibration procedure) and checked before finishing the measurement session. Checking the position of the reference target relative to the angle orientation of the total station ensure that the total station has not moved during the measurement session.

According to an embodiment, the calibration includes the calibration of an EDM unit.

For instance, if a parameter (e.g. the temperature) has changed, the instrument may aim at a reference target and measure the distance between the instrument and the target with the EDM unit. The value of the distance obtained during this calibration measurement may then be compared with the value of the distance obtained during a reference measurement. A reference measurement may for instance be a measurement performed with the EDM unit aiming at the reference target at the arrival on a worksite. In the present embodiment, it is preferable if the reference target has not moved between the reference measurement and the calibration measurement. The target may be located at the great distance from the instrument or at the instrument. However, as it is preferable that the distance between the instrument has not changed, it is advantageous if the reference target is arranged at the instrument, such as described by target 660 in FIG. 6.

Figure 7:
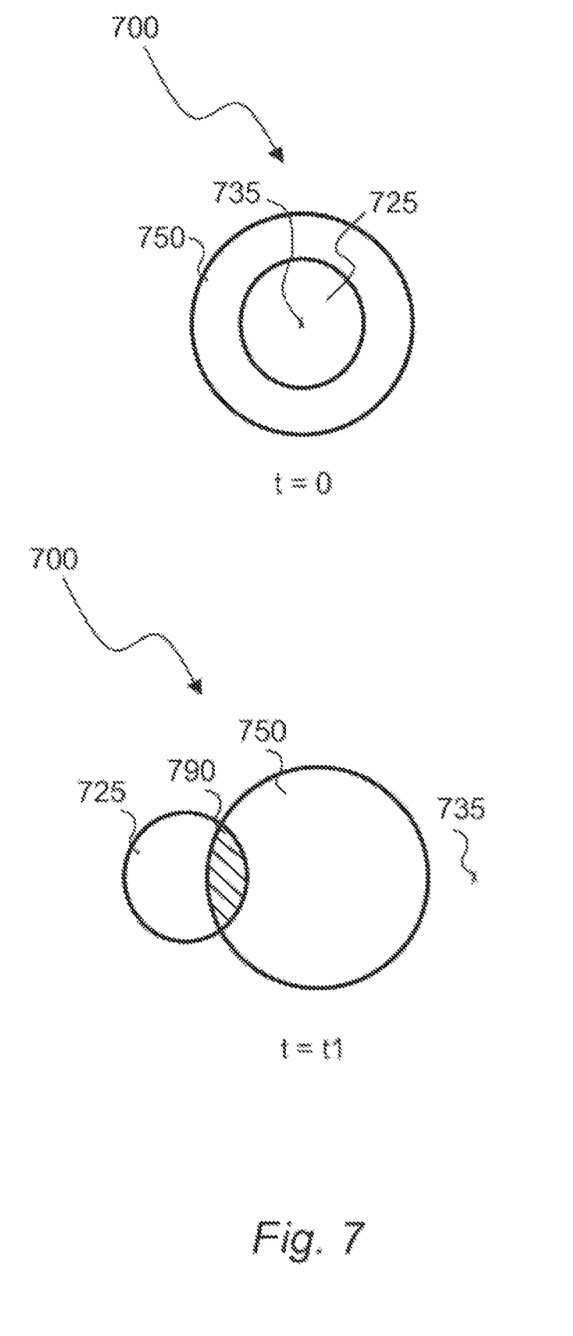
FIG. 7 shows the optical paths of an EDM unit according to an embodiment of the present invention.

With reference to FIGS. 7 and 8, a method for calibrating an EDM unit in accordance with an embodiment of the present invention will be described.

FIG. 7 shows the field of view of the optical paths (channels) of an EDM unit 700 in the target scene. Initially (t=0), e.g. when the instrument is ready for sale, the transmitting optical path 725 (corresponding to the angular cone 302 described with reference to FIG. 3) is aligned with the receiving optical path 750 (corresponding to the angular cone 303 described with reference to FIG. 3) of the EDM unit 700. Further, the instrument axis 735, i.e. the line of sight 135, 335 as described with reference to FIGS. 2 and 3, may also be aligned with the optical paths 725, 750 of the EDM unit. In the example represented in FIG. 7 for t=0, the respective centers of the transmitting optical path 725, the receiving optical path 750 and the instrument axis 735 are aligned.

However, after a certain period of time (t=t1), some deviation between the optical paths 725, 750 may occur. Further, the relative positions of the optical paths 726, 750 may also deviate from the position of the instrument axis 735. The region 790, which corresponds to the intersection (overlapping) between the transmitting optical path 725 and the receiving optical paths 750, corresponds to the active area of the EDM unit. The size of the region depends on the respective deviation of the transmitting and receiving optical paths 725, 750 and defines the operation width (area) of the EDM unit. As the operation width of the EDM unit may change, e.g. because of a shock that the instrument is subject to, a calibration is needed to know the operation width of the EDM unit. The value of the operation width is then taken into account for the measurements performed by the EDM unit. Alternatively, the positions of the optical paths may be adjusted to change the operation width of the EDM unit. The new operation width is then taken into account in forthcoming measurements performed by the EDM unit.

Further, the relative position of the active area or region 790 of the EDM unit to the axis 735 of the instrument (or center of the instrument) may also be calibrated. Such a calibration is particularly advantageous if the instrument comprises a camera for aiming at a target. Determining the deviation between the center of the active area 790 and the instrument axis 735, a new line of sight centered at the center of the active area 790 may be defined.

It is noted that a conventional total station would most likely not be able to operate in a misaligned situation as illustrated in FIG. 7.

Referring to FIG. 8, a method for calibrating an EDM unit in accordance with an embodiment of the present invention will be described. Such a procedure results in the determination of at least one setting of the EDM unit, which may be the operation width of the EDM unit or the relative position of the axis of the EDM unit to the instrument center.

The present method for calibration of an EDM unit may be implemented in the geodetic instrument 200 described with reference to FIG. 2 or a combination of FIGS. 2 and 3.

The method 8000 comprises the step 8010 of scanning a region of interest comprising a reference target with the instrument. The instrument may be rotated by controlling the controllable devices 140, 145 (FIG. 2) or via a separate scanning unit.

The instrument may be set to scan a number of predetermined positions in the region of interest. The number of predetermined positions may be automatically set or manually entered by a user. The number of predetermined positions controls the accuracy of the calibration since an increase in number of positions increases the quality of the calibration. At step 8020, for each of the predetermined positions, a radiation beam is transmitted from the EDM unit towards the position via the transmitting optical channel 725. At step 8030, the EDM unit receives, via the receiving optical channel 750, the part of the radiation beam that is reflected against the position. For each of the positions, the instrument angle corresponding to the position and a signal representative of the received beam are recorded. The procedure is repeated for all predetermined positions or a subset of the predetermined positions (depending on user selection), step 8050.

Once all (or a subset of the) predetermined positions have been scanned, the strengths of the recorded signals are mapped as a function of the recorded angles, at step 8060. Then, the settings of the EDM unit are extracted from the mapping.

It is noted that the instrument may scan the region of interest along horizontal or vertical directions. Scanning along horizontal directions, the mapping results in a plurality of graphs where a graph represents information collected for a scanned horizontal direction.

Analysis of the mapping may result in determination of the operation width of the EDM unit and/or the deviation of the axis of the EDM unit relative to the instrument axis. Preferably, the zone of the scanned region where the reference target is located results in a region of the graph where the signal strengths are great (as compared with the zones where there is no reference target). As a result, the mapping of the signal strengths as a function of the recorded angles leads to a peak corresponding to the zone where there is a reference target. The size of the peak indicates the operation width of the EDM unit. Further, the signal strength in the center of the overlapping region can indicate the maximum possible distance measuring range of the EDM unit. Further, the position of the peak along be axis representing the recorded instrument angles indicate the relative position of the axis of the EDM unit to the instrument axis.

It is noted that the above mentioned method may also be applied for calibration of a tracker comprising a transmitter and a position sensitive detector such as a camera. In such a tracker, the relative position and/or direction of the transmitter and the camera chip may change because of a change in position and/or direction of the transmitter or the camera. According to prior art techniques, such motions are disregarded since a large transmitter covering a large optical field, within which the field of view of the camera is (in principle) always located, is used. However, using a large transmitter reduces the light density received at the camera chip and thereby reduces the distance range of the tracker.

The present method for calibration of a tracker is based on the same principle as the method for calibration of an EDM unit described above with reference to FIG. 8, i.e. scanning a number of predetermined positions in a region of interest for recording instrument angles and signals representative of reflected beams (the initial beam being transmitted from the tracker by the transmitter and the reflected beams being detected at the tracker by the camera) and analysis of the mapping of the recorded signals as a function of the recorded angles. In this method, a transmitter having an optical field as large as the field of view of the camera may be used since any deviation between the position of the transmitter and the position of the camera can be detected. If the transmitter has, for instance, moved to the left relative to the position of the camera, it is detected that the right part of the camera does not receive any radiation, i.e. the active region of the camera is reduced. The reduction of the active region can then be taken into account in forthcoming measurements. The optical field of the transmitter is preferably as large as the field of view of the camera. However, with the present method, the optical field of the transmitter may also be smaller than the field of view of the camera.

Generally, the method described with reference to FIG. 8 may be applied for the calibration of any pair of transmitter and receiver.

According to an embodiment, once the calibration is performed, an acknowledgement is sent to the user. The acknowledgement indicates which instrument settings $P_i$ have been calibrated. Further, the acknowledgement may comprise the deviation between a calibrated instrument selling $P_i$ and a previous value of the instrument setting.

The acknowledgement may be a log-file comprising measurements and results of the calibration. The acknowledgment may include the instrument settings before the calibration and the instrument settings after the calibration in order to indicate the deviation of the instrument corrected by the calibration.

Further, the calibrated instrument settings may be analyzed to check whether they are within a predetermined range. The calibrated instrument setting is compared with tolerance values. If it is determined that the instrument setting is outside the range defined by the tolerance values, a service message is sent to the user. The service message differs from an acknowledgement in that a recommendation to perform a service is included in the message. The service message may inform which of the devices and elements of the instrument have been calibrated and which devices and elements require a more advanced service.

According to an embodiment, the method of the present invention may also comprise a step of sending a message indicating that a calibration will be performed, which is advantageous as the user may stop current measurements sessions.

The present invention is applicable for several types of geodetic instruments such as electronic measuring devices, total stations, robotic total stations, geodetic scanners and/or laser radars.

Although the invention above has been described in connection with preferred embodiments of the invention, it will be evident for a person skilled in the art that several modifications are conceivable without departing from the scope of the invention as defined by the following claims.

The invention claimed is:

1. A method for calibration of a geodetic instrument, said method comprising:
    detecting a value of at least one parameter affecting the measurements made by said instrument;
    recording the detected value of said at least one parameter in a memory if said geodetic instrument is turned off;
    comparing the detected value of said at least one parameter with a predetermined threshold once said geodetic instrument is turned on;
    sending an alert on the basis of the comparison between the detected value of said at least one parameter and said predetermined threshold; and
    if a message including user instructions to calibrate is received by said geodetic instrument in response to the alert:
        searching a reference target or retrieving the position of a reference target;
        aiming said instrument at said reference target; and
        performing said calibration using said reference target.

2. The method of claim 1, wherein the retrieving of the position of a reference target is for a reference target used in a previous calibration.

3. The method of claim 1, wherein the reference target is arranged in the vicinity of the instrument.

4. The method of claim 1, wherein the reference target is arranged at one of a base of the instrument, a tribrach used for leveling of the base of the instrument, or a tripod at which the instrument is mounted.

5. The method of claim 1, wherein the searching of a reference target includes scanning a region by emitting a radiation beam at a number of positions and analyzing signals received at the instrument, said signals being representative of beams reflected at said number of positions.

6. The method of claim 1, wherein the searching of a reference target includes imaging a region by means of a camera and analyzing at least one image captured by said camera to detect said reference target.

7. The method of claim 1, further comprising sending an acknowledgement indicating said calibration.

8. The method of claim 1, further comprising:
    obtaining an instrument setting during said calibration;
    comparing said instrument setting with a range defined by tolerance values; and
    sending a service message upon determining that said instrument setting is outside said range defined by said tolerance values.

9. The method of claim 1, wherein said at least one parameter is one of the group comprising the temperature of the instrument, the ambient temperature, an acceleration representing a mechanical shock or transport stress to which the instrument is subject, a tilt angle corresponding to a deviation between a vertical axis of the instrument and a vertical reference plumb axis, and a period of time corresponding to the periodicity between every calibration of the instrument.

10. The method of claim 1, wherein said calibration includes calibration of at least one of an electronic distance measurement unit of said instrument, a tilt sensor of said instrument, and a camera of said instrument, wherein said camera includes an image sensor.

11. A method for determining the need for calibration of a geodetic instrument, said method comprising:
    monitoring at least one parameter affecting the measurements made by a detector within said geodetic instrument while said geodetic instrument is turned off;
    comparing a value of the monitored parameter with a threshold associated with the monitored parameter once said geodetic instrument is turned on;
    sending an alert on the basis of the comparison, the alert indicating the need for calibration of said geodetic instrument; and
    performing a calibration of said geodetic instrument if a message including user instructions to calibrate is received by said geodetic instrument in response to the alert.

12. The method of claim 11, further comprising performing one of searching for a reference target and retrieving the position of a reference target.

13. The method of claim 11, further comprising sending an acknowledgement indicating which instrument settings have been calibrated.

14. The method of claim 11, further comprising:
    comparing an instrument setting obtained during the calibration with tolerance values; and
    sending a service message if it is determined that the instrument setting is outside the range defined by the tolerance values.

15. The method of claim 11, wherein said at least one parameter is one of the group comprising the temperature of said geodetic instrument, the ambient temperature, an acceleration representing a mechanical shock or transport stress to which said geodetic instrument is subject, a tilt angle corresponding to a deviation between the geodetic instrument vertical axis and a vertical reference plumb axis, and a period of time corresponding to the periodicity between every calibration of said geodetic instrument.

16. The method of claim 11, wherein said geodetic instrument comprises one or both of a camera and a tilt sensor, and wherein said calibration includes calibration of one or both of said camera and said tilt sensor.

17. The method of claim 11, wherein the sending is based on the comparing.

18. The method of claim 11, further comprising:
    generating the message including the user instructions in response to receiving the alert.

* * * * *